Oct. 28, 1952   H. O. WILLIER   2,615,839
RECOVERY OF PRECIOUS METALS FROM PHOTOGRAPHIC BATHS
Filed April 12, 1948
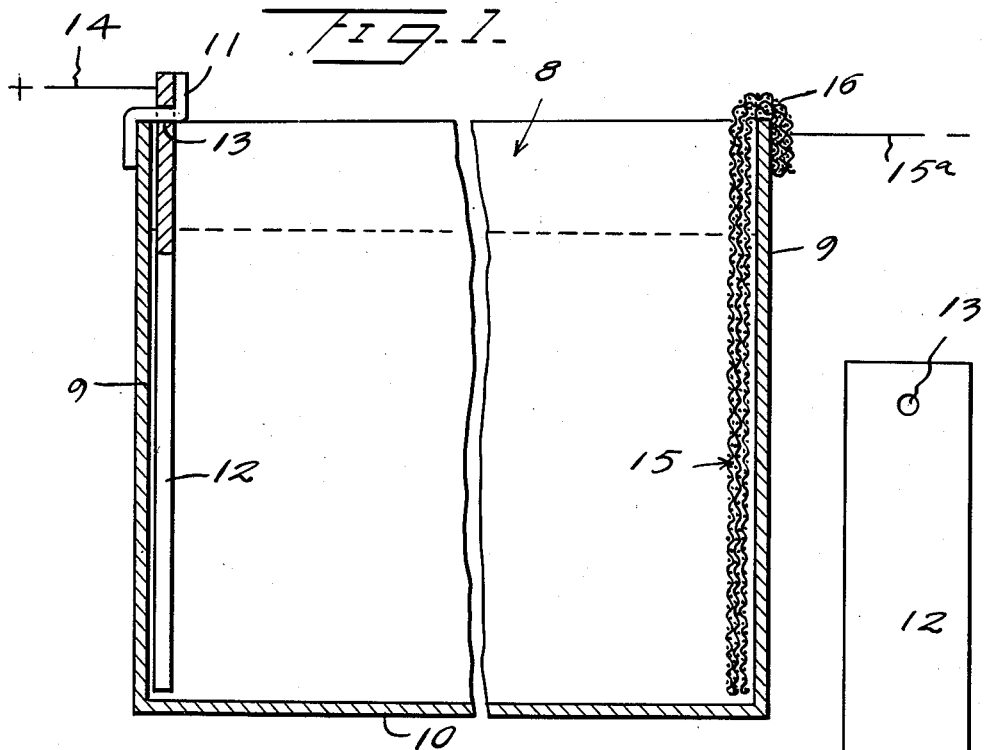
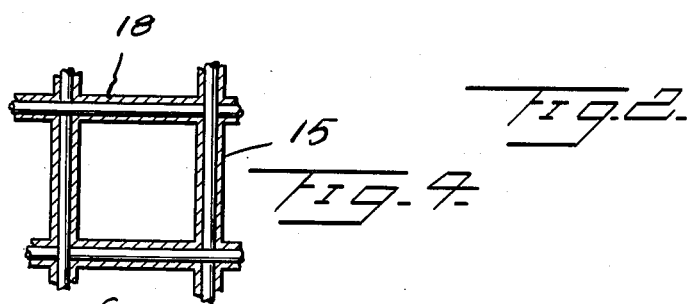
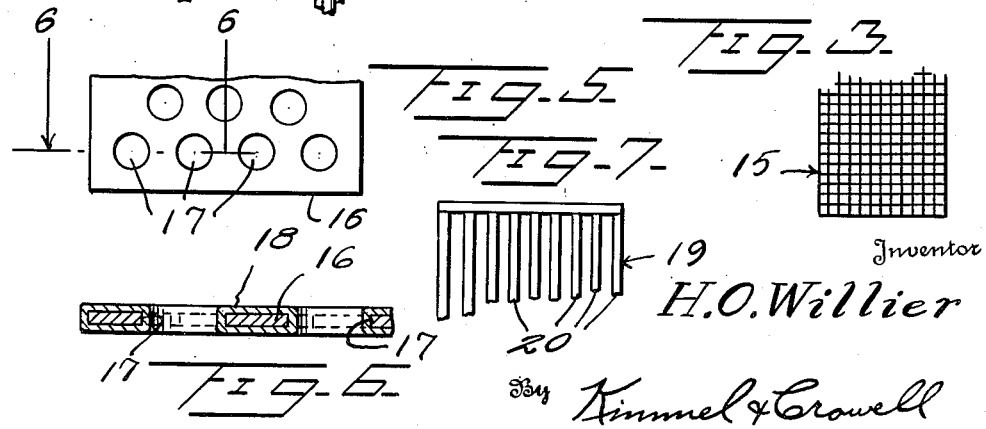

Patented Oct. 28, 1952

2,615,839

UNITED STATES PATENT OFFICE 2,615,839

RECOVERY OF PRECIOUS METALS FROM PHOTOGRAPHIC BATHS

Henry O. Willier, Bethesda, Md.

Application April 12, 1948, Serial No. 20,537

3 Claims. (Cl. 204—109)

Fixing photographic baths or solutions for photographic films, plates and the like are usually made of a solution of sodium thiosulfate, or ammonium thiosulphate to which certain other chemicals are added. It is desirable to remove the silver which accumulates therein after a period of time of use of the bath, this for the value of the metal itself and to prolong the useful life of the bath.

My method of removing the silver is to subject the bath to an electrolysis treatment in a manner as hereinafter described and with certain specific highly advantageous means.

This invention concerns itself therefore with a novel method and apparatus for recovery of precious metals, more particularly silver, from photographic solutions or baths.

In prior methods of electrical silver recovery very special and onerous precautions are usually observed as to voltages; or rapid agitation of the bath, or additions of special chemical "activators" are resorted to. The silver can be recovered on a solid cathode plate but it forms a spongy porous mass which is so weakly adherent to the plate that the slightest jar which usually occurs in working with the solution causes the silver to fall off to the bottom of the tank and there is strong tendency to current density fouling of the bath.

To keep the adherent silver coating on the cathode smooth and not spongy prevents entrapment of pockets of the solution in the silver and prevents consequent fouling of the solution.

I have discovered that by suspending at one side of a fixing bath tank, an anode plate, made for example of graphite, by means of stainless steel or Monel metal hanger rods and at the opposite side of the tank suspending a cathode plate of a particular kind which will be further described, then passing an electric current through the bath, I obviate and eliminate the difficulties heretofore described besides getting out more of the silver and prolonging the life of the bath or solution.

In the drawings, Figure 1 depicts a vertical sectional view wherein is shown a tank 8, for containing a photographic fixing bath or solution and having side walls 9, and a bottom 10, the level of solution being indicated by the broken lines, although it will be understood this level is variable according to ordinary practice. Suspended at one side of the tank 8, as by a hanger 11, which may be of stainless steel or any strong material, not effected by the "hypo" solution, is an anode plate 12, the hanger 11 passing through a suitable opening 13 therein. A lead wire to a source of current supply is indicated at 14. The anode plate extends almost to the bottom of the tank and is slightly spaced from the adjacent side wall 9. At the other side of the tank is a cathode 15, having a suitable lead wire 15a, which in this case is supported by bending a portion 16 thereof over the top edge of the tank wall 9. This cathode is formed of a metal such as stainless steel or Monel metal or any electrically conducting material which is resistant to attack by the bath or solution. It is most conveniently made of wire mesh similar to screen wire, an enlarged detail being shown in Figure 4. The cathode 15 is of several layers of the mesh or screen, bent or reverted one on the other as seen in Figure 1 to thereby present a large working surface area in a small space of the tank. In Figure 2 is seen an elevational view of the anode 12 which may be of graphite or any other suitable material for conducting an electric current. In Figure 3 is shown a fragment of the screen wire or mesh cathode 15.

Figure 5 is a modified form of cathode 16, formed of a thin plate having perforations 17, a section on line 6—6 of Figure 5 being depicted in Figure 6. It will be understood this plate cathode 16 may be of any suitable material as herein further explained and can be bent on itself to provide a large working surface, similarly to the way the cathode 15 is formed. As seen in Figures 4 and 6, the silver indicated as 18, will form around the wires or spacers and gradually build up as a smooth surface. At all times, the perforations 17 will allow the bath or solution to wash through and thus avoid having trapped pockets of bath or solution.

Figure 7 is a modified form of cathode 19 consisting of an arrangement of parallel rods or wires 20. The silver as extracted from the bath or solution will build up smoothly around these rods or wires 20 similarly to the manner in which it is collected on the cathodes 15 and 16.

It will be understood the current flows from the anode to the cathode through the photographic bath to thereby cause the silver to deposit on the cathode.

As will be noted from the drawings, I have shown a tank which may be of any usual shape, an anode suspended at one side and a cathode at the opposite side. Diagrammatically I have represented an electrical connection and source of current supply. As further illustrated, I show the cathode plate as being of metal but having perforations throughout. I have found that very favorable results are had with the cathode being made of Monel metal or of stainless steel, but it may be made of silver or copper-nickel alloy or other metals and metal alloys or any materials which will conduct an electric current and which are not subject to attack by the photographic solution or bath. The most important feature of my cathode is that it shall be formed with or provided with perforations throughout, as for example, it may be in the form of a wire screen mesh. I have used such mesh having 256 openings per square inch of area with great success. The cathode does not however necessarily have to be a screen mesh type. It may be a solid plate having numerous closely spaced openings.

It is essential to have as great a surface area as possible in the cathode for the collection thereon and deposit therein of the silver, but the overall dimensions of the cathode must be kept within such limits as will not interfere with the ordinary work going on in the use of the bath. By using the wire screen mesh or a thin perforated plate type of cathode, I can fold the cathode so as to have a number of layers of surface area giving a large working surface to the cathode within actually a small space.

A cathode formed of what may for convenience be described as a bundle of parallel rods or wires can also be used and thereby obtain large working surface area.

In whatever form the cathode may be made, the essential feature is to provide the large surface area for the metal to deposit thereon and to have spaces for the solution to migrate or circulate through freely, and to obtain a dense, adherent plating of silver, free from sponginess. Such a requirement is ideally met by the thin perforated plate or wire mesh screen herein described. I find that in the case of the wire mesh or bundles of rods or wires, the silver builds up around the surface of each wire until the adjacent wires are so coated that the openings of the mesh are nearly closed. The bridging pieces between the holes in the case of the perforated sheet build up with silver coating until the same result is obtained. The essential point is to permit free migration or circulation of the solution through the cathode to avoid entrapment. The folded screen type of cathode possibly causes a relatively rapid movement of silver ions within the open mesh structure of the screen in the same manner that a grid in an electronic tube accelerates the flow of electrons within such tube. The result of such increased ionic mobility is ultimately to produce the same effect as if the solution itself were agitated, as proposed by others, namely to secure a smooth adherent deposit of silver. My screen cathode accomplishes this without the use of any additional mechanisms. It may also be that the cathode arrangement, in which a multitude of discrete portions of the solution are substantially but not completely encompassed by electrode surfaces, causes silver ions in said portions to move rapidly to the nearest cathode surface and thus rapidly change the specific gravity of those portions and induce circulation or migration of solution through the cathode. In any event, as previously pointed out, no positive agitation of the solution is necessary, the electrolysis being carried on in a normally substantially quiescent solution. While the ordinary work going on in the use of the bath will at times include processing of film and consequently some agitation of the bath, such agitation is not necessary for the practice of the present invention, the process being carried on continuously even during periods when the bath is not being used for film processing.

After the cathode is loaded with silver to a point where removal is desirable, which can be determined merely by inspection of the cathode, the cathode can be cleaned or replaced. The silver does not form on my cathodes in granules or spongy masses. It forms a smooth even coating.

The more silver in the solution or bath the slower its fixing action. Consequently, it is desirable to remove the silver continuously as by my process which is a continuous one and thus keep the solution in a most favorable condition at all times.

It is essential to have an electric current density of such low value that it does not cause the solution to disintegrate and break up into its chemical components.

In order to obtain sufficient current throughput for effective desilverization of heavy duty fixing baths without damage to the bath, others have proposed completely filling a separate tank with a plurality of stainless steel cathodes, and circulating the hypo through this extra tank. This is usually undesirable and is obviated in my apparatus since I have the necessary surface in a compact form by the use of the aforementioned mesh.

My system will operate without any particular agitation of the solution as proposed by others and requires no special attention after the current has been adjusted to the proper value, an extremely desirable feature.

A difficulty with using plain flat sheets, not perforated, as cathodes is that they collect the silver on their surfaces, in the form of small lumps or granular nodules and these at the slightest disturbance of the sheet will fall off into the tank.

I have found that with the use of my types of cathodes and with one volt to one and two-tenths volts direct current at one-fourth ampere to one and one-half ampere, there is a voltage swing of only about two-tenths volts.

I do not intend to limit my invention other than as indicated by the scope of the claims hereunto appended and forming a part hereof, and changes and modifications may be resorted to within the scope of my invention as defined by the said claims.

What I claim is:

1. The method of removing silver from a photographic fixing solution, comprising the steps of: establishing a substantially quiescent body of said fixing solution, establishing an anode zone within but adjacent one side of said body and a cathode zone consisting essentially of an electrodepositing zone of substantial depth within but adjacent the opposite side of said body, passing an electric current from said anode zone to said cathode zone, causing said current to leave said solution in said cathode zone through a multitude of ion collecting cathode surfaces therein facing in all directions, said surfaces being so arranged as to substantially but not completely encompass a multitude of discrete portions of said solution in said electrodepositing zone whereby silver ions in said discrete portions may move in substantially any direction toward one of said surfaces and thus effect rapid removal of said silver ions from said portions.

2. The method of claim 1 wherein said electric current is passed from said anode zone to said cathode zone at a voltage of from one to one and two tenths volts.

3. The method of claim 1 wherein said surfaces are defined by a plurality of closely adjacent layers of wire mesh.

HENRY O. WILLIER.

REFERENCES CITED

The following references are of record in the file of this patent:

UNITED STATES PATENTS

| Number | Name | Date |
|---|---|---|
| 1,776,787 | Ergang | Sept. 30, 1930 |
| 1,866,701 | Garbutt et al. | July 12, 1932 |
| 1,905,467 | Hickman | Apr. 25, 1933 |
| 1,954,316 | Hickman et al. | Apr. 10, 1934 |
| 2,158,410 | Doran | May 16, 1939 |
| 2,275,194 | Sizelove | Mar. 3, 1942 |

FOREIGN PATENTS

| Number | Country | Date |
|---|---|---|
| 100,739 | Great Britain | July 27, 1916 |
| 420,402 | Great Britain | Nov. 30, 1934 |
| 452,466 | Great Britain | Aug. 24, 1936 |
| 27,461 | Australia | Mar. 26, 1941 |